May 19, 1931.  C. G. SMITH  1,806,369
GAS PUMP
Filed May 22, 1925
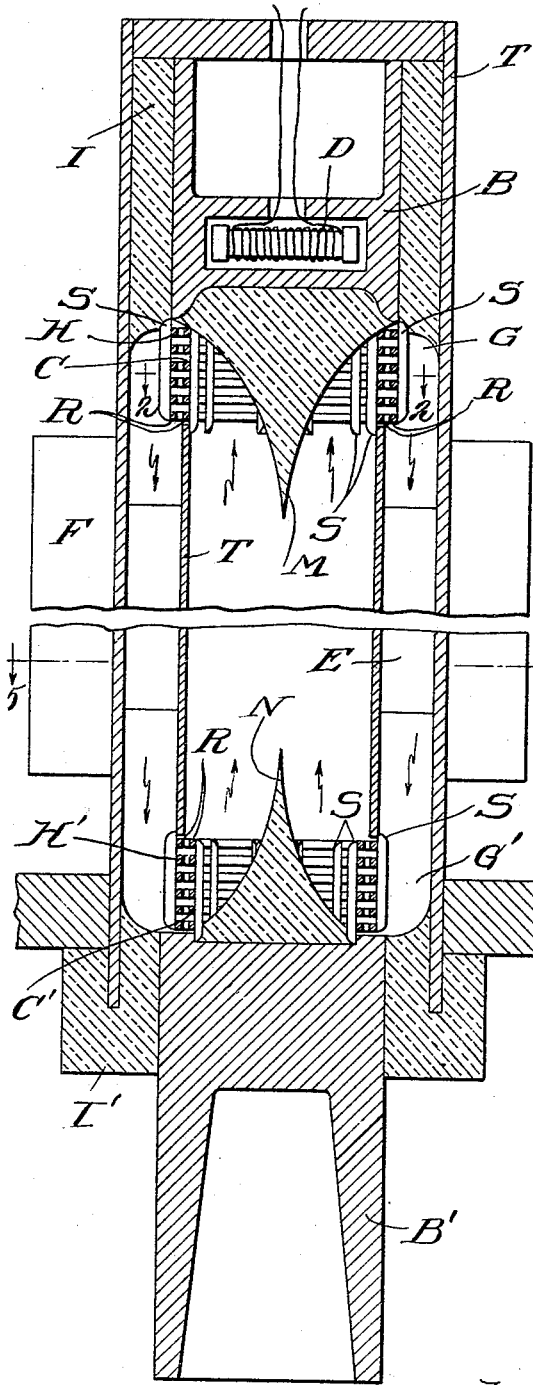
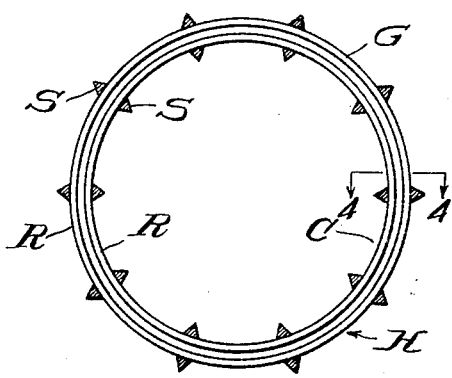
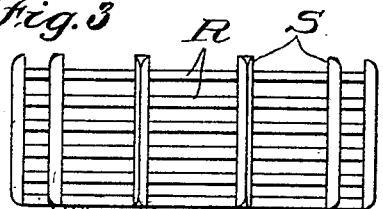
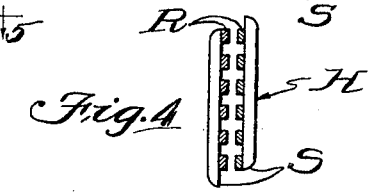
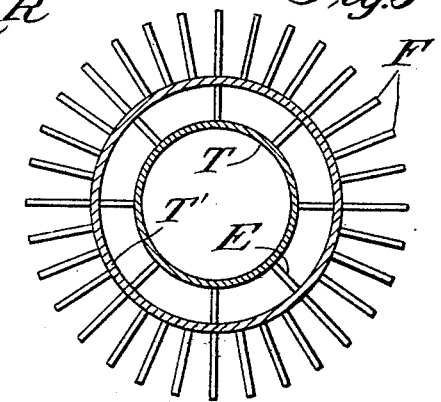
Inventor
Charles G. Smith
by Roberts, Roberts & Cushman
Att'ys.

Patented May 19, 1931

1,806,369

UNITED STATES PATENT OFFICE

CHARLES G. SMITH, OF MEDFORD, MASSACHUSETTS, ASSIGNOR, BY MESNE ASSIGNMENTS, TO CAMBRIDGE LABORATORIES, INC., OF CAMBRIDGE, MASSACHUSETTS, A CORPORATION OF MASSACHUSETTS

GAS PUMP

Application filed May 22, 1925. Serial No. 32,023.

This invention relates to the circulation of a gas by molecular action as disclosed in my Patent No. 1,564,287 of December 8, 1925. The invention utilizes phenomena incident to the bombardment of a solid surface by gas molecules in their molecular movement adjacent the surface and in order to clarify the subsequent description the following definitions are here inserted.

The mean free path of gas molecules is the average distance the molecules travel in their molecular movement before colliding with other molecules, the mean free path varying inversely as the density, that is, as the pressure at a given temperature or the number of molecules per unit volume, and also varying approximately inversely with the size of the molecules.

An accommodation coefficient is a constant expressing the relative rate of transfer of energy between the molecules of a surface and the molecules of an adjacent gas impinging against each other. The higher the coefficient, the more rapid is the transfer of energy between the surface molecules on the one hand and the gas molecules on the other hand. A perfectly black surface, that is, a surface having the proper degree of roughness, has a high accommodation coefficient, while a polished surface has a relatively small accommodation coefficient. This constant depends not only upon the character of the surface but also upon that of the gas. In general the coefficient varies with the molecular weight of the gas, helium and hydrogen having lower coefficients than oxygen and nitrogen for example.

The equilibrium temperature is that at which the average kinetic energy per degree of freedom of the surface molecules on the one hand and the gas molecules on the other hand are equal.

In one aspect the invention consists in transferring thermal energy to or from a surface subjected to molecular bombardment and causing the molecules, in their molecular movement, to rebound from the surface at a different average velocity than they impinge thereupon. If the molecules are caused to rebound at a greater velocity, they absorb heat from the surface and by arranging the surface in conducting or other heat-transfer relation to the region to be cooled, heat is drawn therefrom by the gas and may be dissipated in any suitable way. If the molecules are caused to rebound at a lesser average velocity, heat is delivered from the gas to the surface and by circulating the gas in heat-transfer relation to the region to be cooled, heat may be absorbed by the gas and thence dissipated through said surface to a heat dissipator.

The bombarded surface is preferably in the form of a grid element having small perforations therein and having different accommodation coefficients on opposite sides as by having one side black and the other side bright. For the purpose of pumping a gas, the grid element may be heated to cause the gas molecules to rebound from the side having the higher accommodation coefficient at a higher average velocity than they impinge thereupon, or at least at a higher average velocity than they rebound from the other side, thereby producing a general flow of gas through the grid in the direction from the bright side to the black side; whereas if the grid is cooled to a lower temperature than the gas a general flow of gas is set up in the opposite direction. For cooling purposes the gas may be caused to flow through the grid in any suitable way and in either direction. If the flow is from the bright side thence through the grid element toward the black side the element is placed in heat-conducting or other heat-transfer relation to the region to be cooled, whereby heat is delivered through the grid to the gas by virtue of the molecules rebounding from the black side at a greater average velocity than they impinge; whereas if the flow is in the reverse direction the gas passes in heat-transfer relation to the region to be cooled and the grid element is placed in heat-transfer relation to a heat dissipator, the heat being delivered from the gas to the grid element by virtue of the molecules impinging upon the black side of the grid element at a higher velocity than they rebound therefrom, the black surface being on the windward side of the element. For efficiency, especially when the flow is from the bright to the black side of the element, the gas flow should be at high velocity, e. g. a velocity of the order of one tenth that of the molecular velocity of the gas molecules. For greatest efficiency the width of the perforations in the grid elements should be small, viz., of the order of magnitude of the mean free path of the gas molecules—say within three or four times the mean free path; and under most conditions the distance between adjacent perforations should also be within this general order of magnitude.

While the grid elements may be employed singly, the grids preferably comprise two of the aforesaid grid elements spaced apart as closely as mechanically practical. By arranging the elements with their bright sides facing each other the transfer of heat across the space between the elements is effectively restrained by virtue of the low accommodation coefficient of the surfaces so that one element may be maintained at a much higher temperature than the other. Thus the invention involves the utilization of the phenomena connected with the accommodation coefficient to effect thermal insulation. For the purpose of circulating a gas through the grid the leeward and windward elements of the grid may be arranged in heat-transfer relation with hotter and colder regions respectively, the circulation energy being delivered from the hotter region to the gas through the leeward element by virtue of the molecules of gas rebounding from the black side thereof at a higher average velocity than they impinge. For cooling purposes the leeward and windward elements are preferably arranged in heat-transfer relation to the region to be cooled and a heat dissipator respectively, so that heat is delivered to the leeward element, thence to the gas by virtue of the gas molecules rebounding from the leeward side at a higher average velocity than they impinge, and thence dissipated; although heat may be transferred first to the gas (e. g. from the region to be cooled) and thence to the grid by connecting the windward element to a heat dissipator, heat being delivered to the black surface of the windward element by virtue of the gas molecules impinging at a higher velocity than they rebound owing to the general flow of gas against this surface and to the relative coldness of the surface.

In a double grid such as above referred to the accommodation coefficients of the outer surfaces should be as high as possible and the accommodation coefficients of the opposing surfaces should be as low as possible. By having the two opposing surfaces of low accommodation coefficients the same result is attained as if those surfaces were of high accommodation coefficient, and a heat insulating material were interposed, with the added advantage that it is possible to make the grid thinner by so doing.

The gas employed should have a low accommodation coefficient with respect to a bright surface to minimize the transfer of heat between the juxtaposed elements of each grid. It should also have low atomic weight so that the rate at which the molecules travel in their molecular movement is high, whereby to attain a high rate of working. The mean free path of the gas molecules should be relatively long so that the pressure of the gas need not be reduced to such a low value to obtain the aforesaid relationship between the mean free path and the dimensions of the grid.

The gases which best serve most conditions of use are helium and hydrogen, these gases having a low accommodation coefficient, low atomic weight and long mean free path. Helium has the advantage that its mean free path is about one and one-half times as long as hydrogen. Moreover, the thermal conductivity per molecule of a monatomic gas such as helium is believed to be less than that of a polyatomic gas such as hydrogen, presumably because the molecules have no apparent rotational energy as to those of diatomic gases having dumb-bell and other non-spherical shapes, and for this reason I believe that heat passes less rapidly between the juxtaposed elements of the grids when using a monatomic gas.

In this connection it will be understood that, while hydrogen and helium are preferred, any gas having any one of the above properties can be employed.

For the purpose of illustrating the genus of the invention a specific embodiment is shown in the accompanying drawings in which:—

Fig. 1 is a longitudinal section of a heat exchange device;

Fig. 2 is a transverse section of one of the grids on line 2—2 of Fig. 1;

Fig. 3 is a side view of the grid;

Fig. 4 is a section of the grid on line 4—4 of Fig. 2; and

Fig. 5 is a section on line 5—5 of Fig. 1.

The particular embodiment of the invention chosen for the purpose of illustration comprises two grids G and G' comprising annular elements H—C and H'—C' respectively, arranged coaxially with their inner and outer faces in juxtaposition but not in contact. The annular grid elements comprise longitudinal supports S and circumferential rings R mounted in opposition on the inner and outer faces of the supports respectively. The supports of the inner and outer elements project axially beyond opposite ends respectively of each grid for mounting the respective elements. Both the supports and the rings may be formed of copper or other suitable heat-conducting metal. The opposing faces of the rings may be plated (e. g. with nickel, gold, platinum, etc.) and polished to afford the low accommodation coefficient desired. The outer faces of the outer rings and the inner faces of the inner rings are given an accommodation coefficient as high as possible by roughening, coating, or otherwise rendered effectively black. The width of the grid perforations formed by the spaces between the rings may be approximately one hundredth of an inch when using a gas pressure of about one millimeter of mercury. The juxtaposed rings should be as thin as possible and as close together as possible without touching to minimize the distance through the grid and thereby minimize the resistance to the flow of gas through the grid, the thermal conductivity between the elements increasing no further with decrease of distance therebetween beyond a distance equal to the mean free path of the gas molecules.

The grid element H is mounted on a conducting block B containing a heating coil D; elements C and H' are mounted on the opposite ends of a conducting tube T; and element C' is mounted on a conducting block B' which may be located inside a refrigerator R'. Surrounding tube T in spaced relationship is a conducting tube T' which also encloses the grids and is insulated from blocks B and B' at I and I'. Longitudinal ribs E thermally interconnect tubes T and T' and radiating vanes or fins F are mounted on the outside of tube T'. Insulation may be provided at M and N to direct the flow of gas as hereinafter explained and the exposed surfaces of this insulation, as well as the exposed surfaces of the insulation at I and I', are preferably formed with approximately stream-line contours. The space within the tubes T and T' is filled with a suitable gas such as helium at a pressure consonant with the other factors of the apparatus and with the purpose of use.

Upon application of heat to the grid element H, by conduction through block B from source D, the gas molecules are caused to rebound from the black surface of the element at greater velocity than they impinge thereon and circulation of the gas is produced in the direction of the arrows. Owing to the presence of grid G' across the gas passageway a condition of high pressure will be established in the space between tubes T and T' with a relatively low pressure within the tube T. This is due merely to the mechanical constriction in the gas passage due to the interposition of the grid across it. By virtue of the molecular phenomena outlined above, the flow of gas through grid G' will abstract heat from the block B'. The gas passing through the grid G' from a region of higher pressure to a region of lower pressure will increase in velocity. From this change in velocity it follows that the molecules leaving the black inner surface of the grid G' will have a greater velocity than those impinging on the black outer surface of grid H'. Then, due to the phenomenon explained above, heat will pass from the grid G' to the gas. The expansion of the gas as it emerges into the space of lower pressure within tube T also contributes to the transfer of heat from the block B' through element C' to the gas. In short, the equilibrium temperature of element C' is below the temperature of the gas near C' (as would be indicated by an instrument moving with the gas).

By virtue of the general flow of gas in the direction of the arrow, the gas molecules will impinge upon the black windward surface of the elements H' and C at a higher velocity than they rebound therefrom; consequently heat will be delivered from the gas to these elements and thence through tube T, ribs E, tube T' and vanes F to the atmosphere. Heat will also be delivered from the gas to the atmosphere by conduction to tube T' and direct radiation therefrom as it passes downwardly in contact with tubes T and T' and ribs E. Transfer of heat between the elements of each grid is restrained as above explained.

If the temperature difference between C and H is large and the temperature difference between C' and H' is relatively small, as would ordinarily be the case when employing the invention for refrigeration purposes as shown in the drawings, the velocity of the gas through said grid G should be greater than through G', in which case the total cross-sectional opening in grid G should be less than that of G'; whereas if the temperature difference between C and H is small relatively to that between C' and H' the velocity through grid G should be less than through G' and the total opening in G should be less than in G'.

The upper grid G is composed of inner and outer grid elements C and H respectively. Grid H is heated by heat conducted from the block B coming from the heating coil D. As has been explained, the sides of the grids toward each other are polished, and the sides away from each other are roughened or blackened. Therefore, with the grid C insulated from the block B and grid H in heat conducting relation to said block, it will be obvious that the molecules will leave the blackened outer surface of the grid H at a higher velocity than they impinge on the inner surface of the grid C due to the phenomena described in the introduction to the specification. This will cause a general flow of the gas in the direction of the arrows. The flow of the gas is obstructed, however, by the grid G'. This is a purely mechanical obstruction due to the constriction in the path of the gas and is not dependent on any molecular action whatsoever. However, this obstruction will have the effect of causing a higher pressure on the windward side of the grid G' than on the leeward side. That is, there will be a higher pressure existing between tubes T and T' than within the tube T. Therefore, the gas passing through grid G' will expand to some extent and will, therefore, leave the leeward side of the grid G' at a higher velocity than it impinges thereon. More specifically, the molecules leaving the leeward side of grid C' will have a higher velocity than those impinging on the outer surface of grid H' due to the purely mechanical obstruction of the grid G' and the difference in the pressures on the two sides of the grid G'. However, as explained, when gases leave a grid at a higher velocity than they impinge thereon, heat is abstracted from the grid by the gas. The effect of this will be that heat will flow from the block B' through the grid C' to the gas in a manner similar to that in which heat flows from the block B through the grid H to the gas. The heat will then be taken from the gas by the grids C and H' and conducted through the vanes E to cylinder T' and thence through fins F to the atmosphere. Heat will also flow directly by conduction from the gas to the tube T', vanes F and the atmosphere and by radiation from tube T' and the vanes F to surrounding objects.

A characteristic of the invention consists in that the narrow openings in the grids cause the chaotic energy of the gas to be directed energy away from the grid.

I claim:

1. Apparatus of the character described having a gas passageway, a grid across said passageway, one surface of the grid being a good reflector and an opposite surface being a poor reflector, and a gas in the passageway having a low accommodation coefficient with respect to said good reflector.

2. Apparatus of the character described having a gas passageway, a grid across said passageway, one surface of the grid being a good reflector and an opposite surface being a poor reflector, a gas in the passageway having a low accommodation coefficient with respect to said good reflector, and having a low atomic weight.

3. Apparatus of the character described having a gas passageway, a grid across said passageway, one surface of the grid being a good reflector and an opposite surface being a poor reflector, a gas in the passageway having a low accommodation coefficient with respect to said good reflector, and having a long mean free path.

4. Apparatus of the character described having a gas passageway, a grid across said passageway, one surface of the grid being a good reflector and an opposite surface being a poor reflector, a gas in the passageway having a low accommodation coefficient with respect to said good reflector, having a low atomic weight, and having a long mean free path.

5. Apparatus of the character described having a gas passageway containing helium, a grid across the passageway, one surface of the grid being a good reflector and the other surface being a poor reflector, whereby the first surface has a lower accommodation coefficient for helium than the second surface.

6. Apparatus for circulating gas having a gas passageway, a grid across said passageway having different accommodation coefficients on its opposite sides, and means for controlling the temperature of the grid.

7. Apparatus for circulating gas having a gas passageway, a grid across said passageway having different accommodation coefficients on its opposite sides, and means for controlling the temperature of the grid, the openings in the grid having a dimension comparable to the mean free path of the gas molecules of the gas circulated.

8. Apparatus of the character described having a gas passageway, a grid element across said passageway, and means for controlling the temperature of said element, one side of said grid element being black and the other side bright, whereby the gas molecules in their molecular movement rebound at a greater average velocity from one side of the grid element than from the other side.

9. Apparatus of the character described having a gas passageway, a grid element across said passageway, the width of the grid perforations being comparable to the mean free path of the gas molecules, and means for causing the gas molecules in their molecular movement to rebound at a higher average velocity from one side of the grid element than from the other side.

10. Apparatus of the character described having a gas chamber, a grid in said chamber subjected on opposite sides to the molecular bombardment of the gas in the chamber, the grid comprising juxtaposed elements adapted to be in heat-transfer relation with hotter and colder regions respectively and the opposing faces of the elements having relatively low accommodation coefficients.

11. Apparatus of the character described having a gas chamber, a grid in said chamber subjected on opposite sides to the molecular bombardment of the gas in the chamber, the grid comprising juxtaposed elements adapted to be in heat-transfer relation with hotter and colder regions respectively the opposing faces of the elements having relatively low accommodation coefficients and the width of the grid perforations being of the order of magnitude of the mean free path of the gas molecules.

12. In a device for the circulation of gas having a gas chamber, a grid element in the said chamber subjected on opposite sides to the molecular bombardment of gas in the chamber, opposite sides of the grid element having different accommodation coefficients and the width of the openings of which is of the order of the magnitude of the mean free path of the gas molecules of the gas circulated.

13. In a device for the circulation of gas having a gas chamber, a grid element in said chamber subjected on opposite sides to the molecular bombardment of the gas in the chamber, the opposite sides of the grid element having different accommodation coefficients and the width of openings and distance between openings and thickness of which are of the magnitude of the mean free path of gas molecules of the gas circulated.

14. In a gas circulating device having a gas chamber, a grid in the said chamber subjected on opposite sides to the molecular bombardment of gas in the chamber, the grid having thin perforate elements arranged in non-interconducting juxtaposition, the opposing surfaces of the elements having lower accommodation coefficients than the outer surface, and the width of the perforations being of the order of magnitude of the mean free path of gas molecules of the gas circulated.

Signed by me at Boston, Massachusetts, this 21st day of May, 1925.

CHARLES G. SMITH.